No. 674,896. Patented May 28, 1901.
H. BLUEHER.
IRRIGATING DEVICE.
(Application filed Feb. 28, 1901.)
(No Model.)
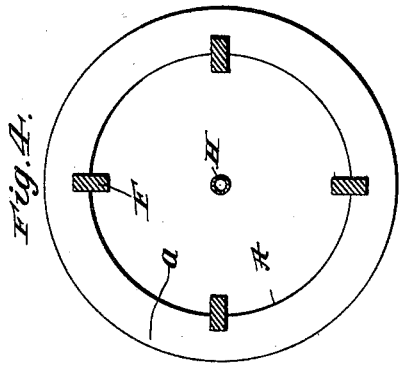
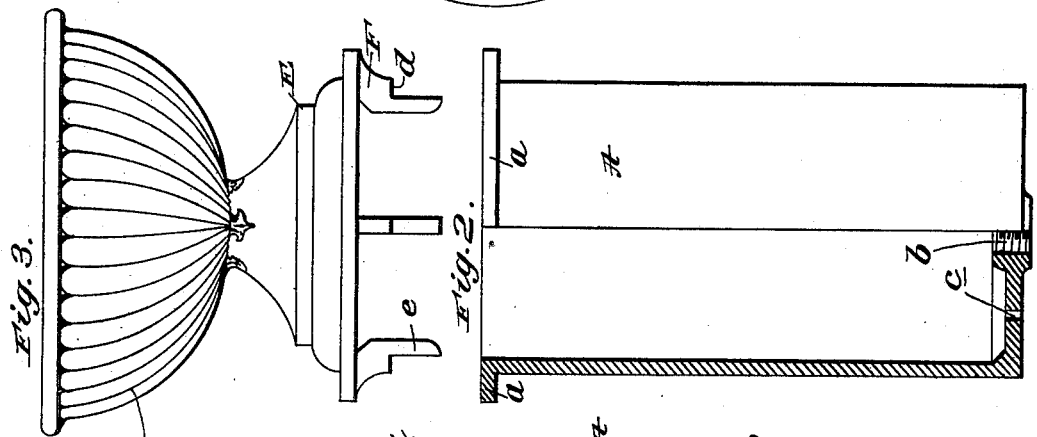
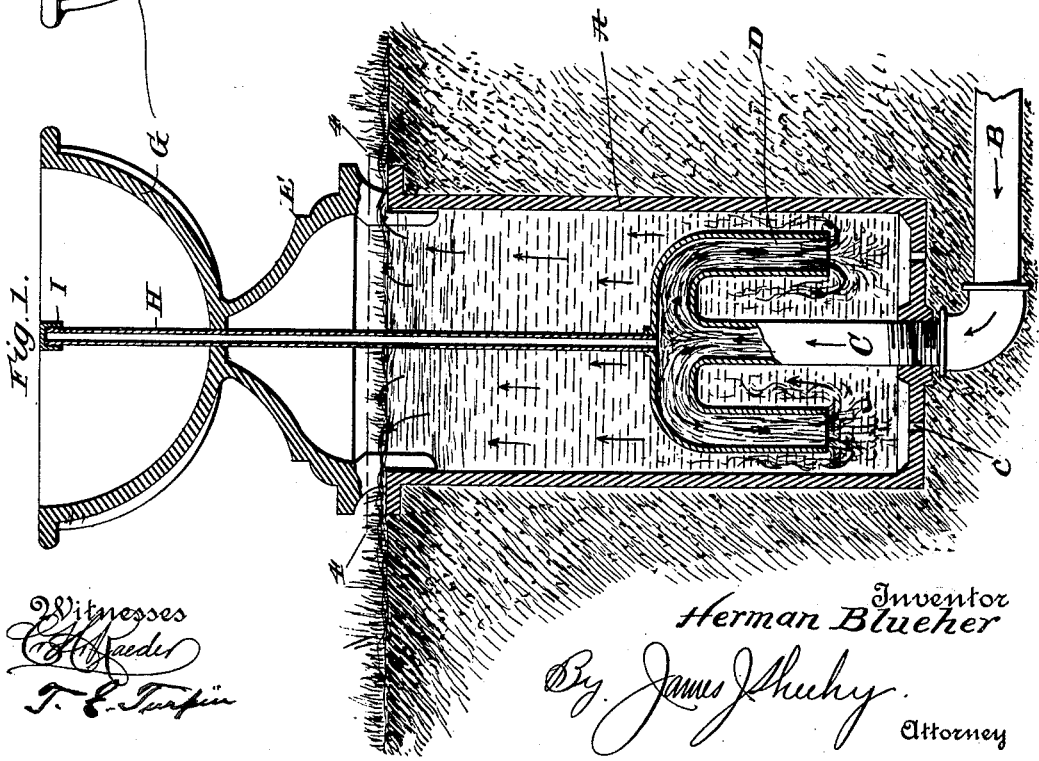
Witnesses
Inventor
Herman Blueher
By James J. Shuhy
Attorney

UNITED STATES PATENT OFFICE.

HERMAN BLUEHER, OF ALBUQUERQUE, TERRITORY OF NEW MEXICO.

IRRIGATING DEVICE.

SPECIFICATION forming part of Letters Patent No. 674,896, dated May 28, 1901.

Application filed February 28, 1901. Serial No. 49,290. (No model.)

*To all whom it may concern:*

Be it known that I, HERMAN BLUEHER, a citizen of the United States, residing at Albuquerque, in the county of Bernalillo and Territory of New Mexico, have invented new and useful Improvements in Irrigating Devices, of which the following is a specification.

My present invention relates to irrigating devices, and is designed more particularly as an improvement upon the lawn watering or irrigating device forming the subject-matter of my contemporary application for patent filed December 27, 1900, Serial No. 41,222.

It has for its object to provide a simple and inexpensive irrigating device adapted to be set and held in a lawn or similar tract of land to be irrigated in such manner as not to detract from the appearance thereof and one which may be depended on to rob a strong head of water of its force and discharge it horizontally and in a steady and placid manner on the lawn, so as to insure the spread of water over the lawn and at the same time obviate the liability of that portion of the lawn adjacent to the device being washed out or in any way injured or marred.

With the foregoing in mind the invention will be fully understood from the following description and claims when taken in conjunction with the accompanying drawings, in which—

Figure 1 is a sectional view illustrating my improved device in its proper operative position. Fig. 2 is a view, partly in elevation and partly in diametrical section, of the tank and of the device. Fig. 3 is an elevation of the cover thereof; and Fig. 4 is a detail horizontal section taken in the plane indicated by the broken line 4 4 of Fig. 1.

Similar letters of reference designate corresponding parts in all the views of the drawings.

The tank A of my improved device is preferably made of metal and cylindrical in form, although it may be made of any material suitable to the purpose of my invention and of any shape desired in cross-section. It is designed to be set in a lawn or similar tract to be irrigated with its upper end flush with the surface thereof, after the manner shown in Fig. 1, and is preferably provided at its upper end with a horizontal flange $a$, this with a view of lessening the liability of its sinking below its proper operative position. It is also preferably provided in its bottom with a central threaded aperture $b$ and a plurality of small apertures $c$, the latter having for their purpose to permit water to drain from the tank subsequent to the operation of the device, and thus remove the liability of water freezing in the tank.

Connected to the opening $b$ in the bottom of the tank is a pipe B, which may lead from a main or other source of supply, and also connected to said opening and extending upwardly within the tank is a pipe C, which terminates in one or a plurality of downwardly-disposed discharge portions D. By virtue of this construction it will be apparent that a head of water proceeding under great pressure through the pipe B and the pipe C will be discharged downwardly against the bottom of the tank, and thereby robbed of a considerable portion of its force; also, that the weight of the water contained in the tank will tend to check the force of the incoming head of water, with the result that the water discharged at the upper end of the tank will flow horizontally therefrom in a steady and placid stream or streams and will be spread over the lawn without liability of that portion of the lawn immediately adjacent to the tank being washed out or otherwise injured or marred.

The tank-cover E is preferably of cast-iron and is provided with depending lugs F, which have shoulders $d$, designed to bear on the upper end of the tank and support the cover a slight distance above the same, and reduced lower portions $e$, arranged to rest within the tank, and thereby hold the cover against lateral displacement therefrom. The said cover is removable in order to facilitate placing of the pipe C in the tank and might be made flat, so as to project but a minimum distance above the surface of the lawn, without departing from my invention. I prefer, however, to shape it as shown and provide it with an urn or vase G, which is calculated to enhance the beauty of a lawn, especially when it contains growing plants. I also prefer when the cover is provided with a crown vessel or urn to connect a pipe H to pipe C and extend said pipe H up through the bottom of the crown vessel or urn after the manner shown in Fig.

1. The pipe H is designed to supply water to the crown vessel or urn, and when it is designed to shut off such supply the same may be effected by a screw-cap I on the upper end of the pipe, a valve, or other suitable means.

In practice I contemplate arranging a number of my improved irrigating devices at various points on a lawn, so that when desired the entire surface thereof may be thoroughly watered. This may obviously be done at small expense, because of the simplicity and cheapness of the devices.

I have entered into a detail description of the present and preferred embodiment of my invention in order to impart a full, clear, and exact understanding of the same. I do not desire, however, to be understood as confining myself to the specific construction and relative arrangement of parts herein pointed out, as such changes or modifications may be made in practice as fairly fall within the scope of my claims. I also do not desire to be understood as confining myself to the employment of a removable cover, as, when preferred, the cover might be permanently connected to the upper end of the tank.

Having described my invention, what I claim, and desire to secure by Letters Patent, is—

1. An irrigating device comprising a tank set in the tract of land to be irrigated, and having a lateral outlet disposed in a plane immediately above the surface of the tract, and a conduit in the tank, connected with a source of water-supply, and provided with a downwardly-disposed discharge portion.

2. An irrigating device comprising a tank adapted to be set in a tract of land to be irrigated, and connected with a source of water-supply; the said tank having a cover supported above its upper end, and also having one or more laterally-disposed outlets between its said end and cover.

3. An irrigating device comprising a tank adapted to be set in a tract of land to be irrigated, and having a cover supported above its upper end, and one or more laterally-disposed outlets between its said end and cover, and a pipe in the tank, provided with one or more downwardly-disposed discharge portions, and adapted to be connected with a source of water-supply.

4. An irrigating device comprising a tank adapted to be set in a tract of land to be irrigated, a cover having depending lugs provided with shoulders bearing on the upper end of the tank, and portions resting within the same, whereby laterally-disposed outlets are formed between the tank and cover, a conduit connected to the bottom of the tank and adapted to be connected with a main or other source of supply, and a pipe arranged in the tank and connected with said supply-conduit and provided with one or more downwardly-disposed discharge portions.

5. An irrigating device comprising a tank, a cover supported above the upper end of the tank, whereby one or more lateral outlets are formed between it and the tank, and having a crown vessel, and a conduit adapted to be connected with a source of supply, and having discharges for supplying water to the tank and crown vessel.

In testimony whereof I have hereunto set my hand in presence of two subscribing witnesses.

HERMAN BLUEHER.

Witnesses:
EDWIN S. GLEASON,
JNO. ROGER HAYNES.